United States Patent
Gautama

(10) Patent No.: US 9,380,389 B2
(45) Date of Patent: Jun. 28, 2016

(54) MULTIPATH INTERFERENCE REDUCTION

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 179 days.

(21) Appl. No.: 14/023,350

(22) Filed: Sep. 10, 2013

(65) Prior Publication Data

US 2014/0072122 A1  Mar. 13, 2014

(30) Foreign Application Priority Data

Sep. 13, 2012 (EP) .................................. 12184322

(51) Int. Cl.
| | | |
|---|---|---|
| *H04H 20/48* | (2008.01) | |
| *H04R 5/04* | (2006.01) | |
| *H04H 40/72* | (2008.01) | |
| *H04L 25/03* | (2006.01) | |

(52) U.S. Cl.
CPC ................ *H04R 5/04* (2013.01); *H04H 40/72* (2013.01); *H04L 25/03159* (2013.01)

(58) Field of Classification Search
CPC ......... H04B 1/1081; H04H 40/72; H04R 5/04
See application file for complete search history.

(56) References Cited

U.S. PATENT DOCUMENTS

| | | |
|---|---|---|
| 6,173,166 B1 | 1/2001 | Whitecar |
| 6,826,392 B2 | 11/2004 | Tsuji et al. |
| 7,174,135 B2 | 2/2007 | Sluijter et al. |
| 7,590,169 B2 | 9/2009 | Gaal |
| 8,311,840 B2 | 11/2012 | Giesbrecht et al. |
| 2001/0044289 A1* | 11/2001 | Tsuji et al. ..................... 455/296 |
| 2004/0166820 A1* | 8/2004 | Sluijter et al. ................ 455/221 |
| 2006/0205346 A1 | 9/2006 | Evans et al. |
| 2010/0189133 A1 | 7/2010 | Aizawa |
| 2011/0268169 A1 | 11/2011 | Mitsugi et al. |

FOREIGN PATENT DOCUMENTS

| | | |
|---|---|---|
| CN | 1520590 A | 8/2004 |
| CN | 1893412 A | 1/2007 |
| CN | 101116259 A | 1/2008 |
| CN | 102238115 A | 11/2011 |
| EP | 0 973 269 A2 | 1/2000 |

OTHER PUBLICATIONS

Ishikawa, T. et al. "FMX Decoder IC Development", IEEE Transactions on Consumer Electronics, vol. CE-33, No. 3, pp. 312-318 (Aug. 1987).
Extended European Search Report for Patent Appln. No. 12184322.1 (Feb. 5, 2013).
Office Action from counterpart application CN 201310403669.0 (Feb. 2, 2015).

* cited by examiner

*Primary Examiner* — Joseph Saunders, Jr.

(57) ABSTRACT

The invention provides an audio signal processing system in which a magnitude spectrum of a frequency domain audio signal is processed based on a measure of multipath interference. The processing keeps the magnitude spectrum approximately fixed during periods of multipath interference, for example by replacing it with a temporally smoothed version of the magnitude spectrum. The magnitude spectrum (processed if required) and the phase spectrum are combined to derive a frequency domain output, which is transformed to the time domain.

14 Claims, 2 Drawing Sheets

MULTIPATH INTERFERENCE REDUCTION

CROSS-REFERENCE TO RELATED APPLICATIONS

This application claims the priority under 35 U.S.C. §119 of European patent application no. 12184322.1, filed on Sep. 13, 2012, the contents of which are incorporated by reference herein.

This invention relates to multipath interference reduction, in particular in FM radio receivers.

FM radio receivers need to be able to deal with various types of interferences, among which multipath noise, which can introduce spike bursts on the audio signal.

This type of interference originates from the fact that the radio antenna receives the signal that comes directly from the transmitting antenna and also indirect signals that are reflections of the direct signal from passing objects or buildings. These reflected signals are generally out of phase with the direct signal, and both constructive and destructive interferences can be present when the two signals merge.

In FM broadcasting, the demodulated FM-stereo signal consists of a mono audio signal in the form of the sum signal (L+R, "Main" channel), transmitted as baseband audio in the range of 30 Hz to 15 kHz, a pilot tone of 19 kHz and a stereo difference signal (L−R, "Sub" channel) amplitude modulated on a 38 kHz sub carrier, occupying the baseband range of 24 kHz to 53 kHz. The representation of a stereo audio signal as a sum and a difference signal, rather than a left and a right audio signal, ensures compatibility with mono receivers, which only use the Main channel.

Multipath interferences can cause short spike bursts on both the sum and the difference signal. There are several known methods to detect the presence of multipath interferences, for example as disclosed in U.S. Pat. No. 6,173,166.

In order to reduce the audio artifacts caused by multipath interferences, known methods include adjusting the stereo separation (attenuating the difference signal), low-pass filtering the audio signal when multipath interferences are detected, and signal interpolation (for example as disclosed in U.S. Pat. No. 6,826,392).

The known approaches to reduce the audio artifacts caused by multipath interferences can be insufficient. When the stereo separation is adjusted, only the artifacts on the difference signal are removed, and artifacts on the sum (mono) signal are not addressed.

By low-pass filtering the audio signal, the high-frequency part of the interference is removed, but at the same time, the high-frequency content of the audio signal is removed, leading to audible artifacts.

Finally, signal interpolation can work very well, but this largely depends on the frequency content of the signal and the order of the interpolation. On some signals, interpolation will introduce signal discontinuities.

According to the invention, there is provided a method and apparatus as defined in the independent claims.

In one aspect, the invention provides an audio signal processing system, comprising:
  an input for receiving at least an audio signal which has been wirelessly transmitted;
  a delay element;
  a time domain to frequency domain converter;
  an extraction unit for extracting magnitude and phase spectra having magnitude components and phase components;
  a processor for processing the magnitude spectrum based on an indication of multipath interference;
  a combiner for combining the processed magnitude spectrum and the phase spectrum to derive a frequency domain output; and
  a frequency domain to time domain converter.

The invention is based on the assumption that the signal characteristics remain substantially constant during the multipath interference. By replacing the magnitude spectrum during multipath interference by a processed magnitude spectrum, the signal can be reconstructed in such a way that the signal characteristics remain the same as (or are based on) the audio signal just before the interference. The approach can be applied to both the sum and the difference signals, and does not introduce filtering effects. Therefore, the output audio signal will contain fewer audible artifacts than the known methods.

The use of the magnitude spectrum is based on the realisation that the phase distortion has a smaller effect on the signal than the magnitude distortion.

The indication of multipath interference can be presence indication or a level indication, or a prediction based on other monitored parameters.

The processor can perform a smoothing function over time.

The smoothing function can operate both during interference detection and normal reception. The smoothing can comprise a real time function which generates an updated value each time a new sample is received. The influence of the new sample on the updated value can then be dependent on a time constant. The larger the time constant, the more the previous signal values dictate the output.

A typical multipath interference is of the order of 5 ms long. The time constant can be sufficiently small that variations in the audio are captured when no interference is detected.

When no interference is detected, there can be no processing at all of the magnitude spectrum before it is recombined with the phase spectrum.

When interference is detected, the smoothing function output can be used. A longer time constant can then be employed (so that the samples received during interference have little influence on the updated values) or the smoothing process may be halted, equivalent to an infinite time constant.

This halting is equivalent to the processor performing a fixing function during the multipath interference, which fixes the magnitude spectrum to the level of the magnitude spectrum before the detection of multipath interference, or to the smoothed level based on an average before the detection of multipath interference.

In this way, the smoothing function can be performed continuously, and the fixing function is performed during the multipath interference.

In one example, the processor receives a binary signal indicating the presence or absence of multipath interference, and processes the magnitude spectrum differently when the presence of multipath interference is indicated. As explained above the smoothing operation can be performed continuously in the absence of a multipath interference. When the presence of a multipath interference is indicated, the magnitude spectrum is either kept fixed, or it is smoothed with a longer time constant, In another example, the processor receives a detector signal indicating a level of multipath interference, and processes the magnitude spectrum in dependence on the level of multipath interference. This enables processing tailored to the level of interference. For example, a mixer can be used for mixing the magnitude spectrum and a processed magnitude spectrum with a mixing ratio which is dependent on the detector signal.

In another aspect, the invention provides an audio signal processing method, comprising:

receiving at least an audio signal which has been wirelessly transmitted;

delaying the audio signal;

converting the delayed audio signal from the time domain to the frequency domain;

extracting magnitude and phase spectra of the frequency domain signal having magnitude components and phase components;

processing the magnitude spectrum based on an indication of multipath interference;

combining the processed magnitude spectrum and the phase spectrum to derive a frequency domain output;

converting the frequency domain output to the time domain.

The invention can be implemented as a computer program comprising code means which when run on a computer implements the method of the invention.

An example of the invention will now be described in detail with reference to the accompanying drawings, in which.

The invention provides an audio signal processing system and method in which a magnitude spectrum of a frequency domain audio signal (such as the sum signal) is processed based on a measure of multipath interference. The processing keeps the magnitude spectrum approximately fixed during periods of multipath interference, for example by replacing it with a temporally smoothed version of the magnitude spectrum. The magnitude spectrum (processed if there have been periods of interference) is combined with the original phase spectrum to derive a frequency domain output.

Figure 1:
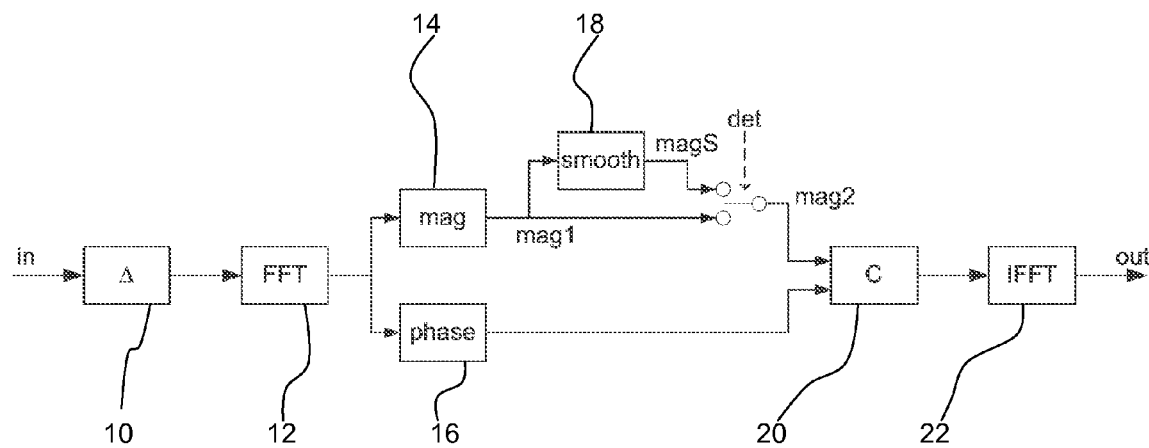
FIG. 1 shows an example of audio processing system of the invention.

An example of a system of the invention for the suppression of multipath interferences is shown in FIG. 1.

In this example, the input "in" consists of the sum signal. The system can however be duplicated to perform similar processing on the difference signal.

The input is delayed by a delay line 10, after which it is transformed to the frequency-domain by the FFT unit 12. The resulting complex-valued spectrum is split into the magnitude spectrum ("mag1") by the magnitude unit 14 and the phase spectrum by the phase unit 16. The complex-valued FFT spectrum consists of a series of complex-valued numbers, each of which corresponds to a frequency. By taking the magnitudes of these complex-valued numbers, the magnitude spectrum is obtained, and by taking the angles, the phase spectrum is obtained.

The magnitude spectrum is smoothed over time by the smoothing unit 18 (yielding "magS") and, depending on a detector that is sensitive to multipath interferences, the magnitude spectrum "mag1" is replaced by or mixed with the smoothed magnitude spectrum "magS" if a multipath interference is detected. The resulting magnitude spectrum ("mag2") and original phase spectrum are combined by the combiner 20 and the inverse FFT of this complex-valued spectrum is obtained by IFFT unit 22. This yields the enhanced output.

Figure 2:
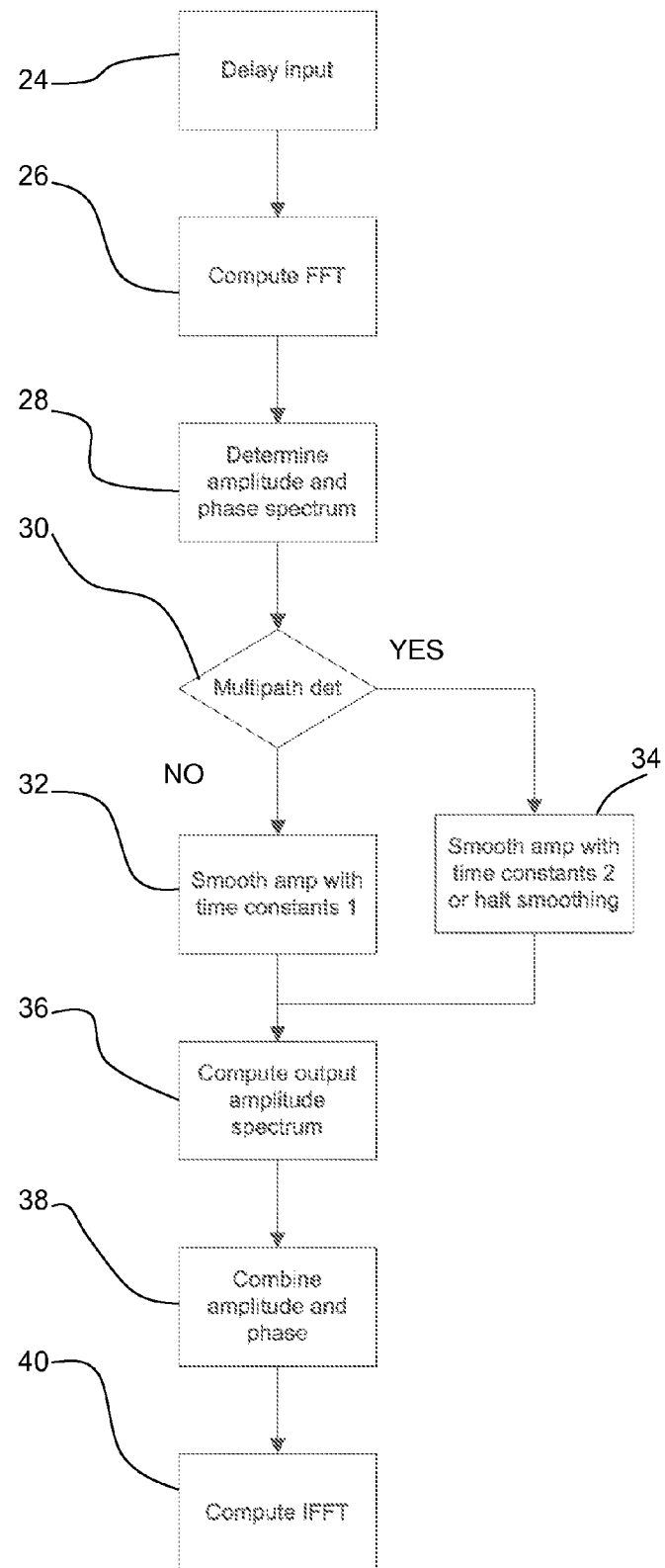
FIG. 2 shows an example of method of the invention.

A flow-chart is shown in FIG. 2.

The input is delayed in step 24, then converted to the frequency domain in step 26.

The magnitude and phase spectrum are derived in step 28.

The detection of multipath interference is shown as step 30. In the example shown, this provides an indication (yes or no) of the presence of multipath interference. If there is no detected interference, no processing is needed (as shown in FIG. 1). However, the smoothing function is applied to build up a memory of a smoothed value, suitable for use when interference is detected. This smoothing is based on a short duration smoothing time constant (e.g. 5 ms to 30 ms). This is shown as step 32.

If there is detected interference, the smoothed output is used to replace the magnitude spectrum. The smoothing constant is changed, so that the samples received during the interference then have little influence on the smoothed output. The smoothing thus switches to a longer duration smoothing time constant (e.g. 1 s) so that the audio signal is largely based on the signal received before the interference. This is shown as step 34.

The smoothing may instead by halted, so that the single previous smoothed value is used as the output. This is equivalent to an infinite time constant, and has been termed "halt smoothing" in FIG. 2.

In a different example, a multi-level signal indicating the level of interference is used to control the audio processing.

The output magnitude spectrum is obtained in step 36, and this is combined with the original phase information in step 38 before conversion back to the time domain in step 40.

The reasoning behind the proposed approach is described below.

During a multipath interference, the audio signal is contaminated by noise, both in magnitude and phase. Therefore, in the frequency domain, both the magnitude and phase spectrum are distorted. If it is assumed that the clean audio signal is short-time stationary, i.e., that its signal statistics remain the same over a short time span (during, say, 5 ms), the magnitude spectrum will not vary very quickly. Therefore, if the magnitude spectrum is replaced by the magnitude spectrum right before the multipath interference (or an on-line smoothed version), the magnitude distortion can be decreased considerably. The phase spectrum is still distorted, but this is less noticeable than the magnitude distortion.

The smoothed magnitude spectrum can be obtained in several ways. It can be computed using a fixed time constant (of, say, 30 ms). This time constant defines a forgetting factor (a measure of how quickly changes are reflected in the average). This smoothing function can be based on a recursive estimate of the average:

$$av[k]=\alpha*av[k-1]+(1-\alpha)*newValue[k]$$

The value of $\alpha$ is related to the smoothing time constant. An infinite time constant corresponds to $\alpha=1$, and the new values do not alter the running average at all. A low time constant equates to a value of $\alpha$ close to zero so that the new sample values have an influence on the running average. The time constant can be considered to be a time window over which the previous samples have an influence. The longer the time window, the less influence the new samples have. However, up to the point of interference detection, a small time constant is desired, so that the changes in audio leading up to the interference event are detected. Once the interference has been detected, a longer time window is desired so that the influence of the invalid samples is reduced.

The smoothing function can be computed using asymmetrical smoothing, in which case different time constants can be used depending on whether mag1 ($\omega$) is lesser or greater than the current magS($\omega$) (for each frequency $\omega$ separately).

If the time constant is larger when mag1 ($\omega$)>magS($\omega$), the smoothing will be slower for peaks in mag1 ($\omega$), and the average will be more robust to peaks. However, it will be slower to follow increases in mag1 ($\omega$).

The objective is that the average magnitude spectrum does not change significantly (or even remains constant) during multipath interferences.

The delay line 10 is used for implementing a look-ahead mechanism. Indeed, it may be beneficial to start the magnitude spectrum replacement right before the multipath detection. In this way, the processing can be performed in a more gradual fashion, lowering possible artifacts due to the switching between the smoothed magnitude spectrum ("magS") and the original magnitude spectrum ("mag1"). The output magnitude spectrum ("mag2") can be computed as a weighted sum of mag1 and magS:

$$mag2(\omega)=\gamma mag1(\omega)+(1-\gamma)magS(\omega) \qquad (1)$$

where $\gamma$ is the mixing factor that decreases from 1 to 0 during the look-ahead period, and increases from 0 to 1 afterwards.

Figure 3:
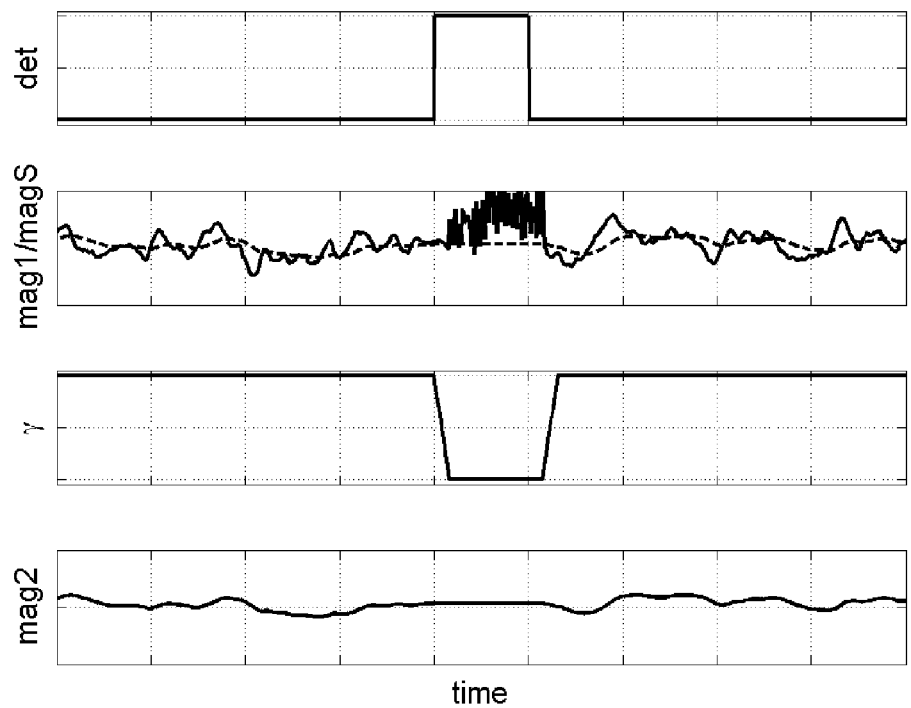
FIG. 3 shows waveforms to illustrate the operation of the method of the invention.

This is illustrated in FIG. 3.

The upper panel shows the output of the multipath detector ("det"), which is high when a multipath interference is detected. In the second panel, the magnitude "mag1" of a single frequency is shown (solid curve). It can be observed that the interference starts a short period of time after the onset of the detection, due to the look-ahead delay line.

In the absence of the delay line, the interference would start simultaneously or even slightly before the onset of the detector signal (in the case that the detection requires some processing time). The smoothed magnitude, "magS", is represented by the dashed curve and it can be seen that the smoothing is stopped when the detector output is high.

The mixing factor $\gamma$ is shown in the third panel.

At the onset of the detection, the mixing factor linearly decreases to zero and remains zero during the detection. When the detector returns to zero, the mixing factor remains zero for a period equal to the look-ahead delay line, after which it linearly increases to unity.

The lower panel shows the resulting output spectrum ("mag2") for a particular frequency, obtained as described in Equation 1 above.

Rather than a 0/1 detector for multipath interference, a measure for the probability of a multipath interference may be available. This criterion could then be used to control the smoothing time constants and a mixing factor used to combine the unprocessed magnitude spectrum with the smoothed magnitude spectrum as shown by the mixing switch in FIG. 2. This may lower the risk of audible artifacts due to the switching between magnitude spectra.

The system operates on a per-frequency basis with computation of the average magnitude spectrum for each frequency. However, there is only one detection signal which is for a global (not-frequency-specific) interference event.

The invention can be implemented as a software module that processes an FM audio signal. The input signals is the sum signal, and optionally also the difference signal.

The module requires the following components:
a detector or a criterion for the probability of multipath interferences
a time-to-frequency transform
a means for extracting the magnitude and the phase spectrum
a means for smoothing the magnitude spectrum
a means for computing the enhanced magnitude spectrum, controlled by a detector or criterion for multipath interferences-a means for combining the magnitude and phase spectrum into a complex-valued spectrum; and
a frequency-to-time transform The invention can be part of an FM stereo tuner, implemented as a software module to improve the audio signal quality in the presence of multipath interferences.

The invention makes use of an indication of the presence or level of multipath interference. This can be derived in known ways.

For example the multipath noise can be detected based on an analysis of the instantaneous noise level and its derivative. If this derivative exceeds a threshold (which depends on the modulation energy of the broadcast signal) then multipath noise is determined to be present.

Another approach is to compare an instantaneous signal strength with an average signal strength and compare with a threshold.

Another approach is to measure high frequency signal energy and compare with a threshold.

Another approach is to detect a drop in received signal strength below a threshold (indicating destructive interference).

These approaches are all outlined in U.S. Pat. No. 6,173,166.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An audio signal processing system, comprising:
an input for receiving at least an audio signal which has been wirelessly transmitted;
a time domain to frequency domain converter;
an extraction unit configured to extract magnitude and phase spectra having extracted magnitude components and extracted phase components;
a processor configured to process the extracted magnitude components based on an indication of multipath interference;
a combiner configured to combine the processed magnitude components and the phase spectrum to derive a frequency domain output; and
a frequency domain to time domain converter;
wherein the processor is configured to receive a detector signal indicating a level of multipath interference, and is configured to process the extracted magnitude components in dependence on the level of multipath interference; and
wherein the processor comprises a mixer configured to mix the extracted magnitude components and the processed magnitude components with a mixing ratio which is dependent on the detector signal.

2. A system as claimed in claim 1,
wherein the processor is configured to perform a smoothing function over time.

3. A system as claimed in claim 1, wherein the processor
is configured to perform a smoothing function with a first time constant when multipath interference is not detected, and
is configured to perform a smoothing function with a second time constant, which is longer than the first time constant, when multipath interference is detected.

4. A system as claimed in claim 1, wherein the processor
is configured to perform a smoothing function with a first time constant when multipath interference is not detected, and
is configured to perform a fixing function when multipath interference is detected, which fixes the extracted magnitude components affected by multipath interference to the smoothed level of the extracted magnitude components not affected by multipath interference.

5. A system as claimed in claim 1, wherein:
the processor is configured to receive a binary signal indicating a presence or absence of multipath interference, and is configured to process the extracted magnitude components only when the presence of multipath interference is indicated.

6. The audio signal processing system of claim 1, further comprising:
a delay element.

7. A system as claimed in claim 1, further comprising
an FM radio receiver; and
a wireless receiver circuit configured to receive stereo FM broadcast signals and configured to provide a sum signal or a difference signal as input to the system.

8. An audio signal processing method, comprising:
receiving at least an audio signal which has been wirelessly transmitted;
converting the audio signal from the time domain to the frequency domain;
extracting magnitude and phase spectra of the frequency domain signal having extracted magnitude components and extracted phase components;
processing the extracted magnitude component based on an indication of multipath interference;
combining the processed magnitude components and the phase spectrum to derive a frequency domain output;
converting the frequency domain output to the time domain;
receiving a detector signal indicating a level of multipath interference, and processing the extracted magnitude components in dependence on the level of multipath interference; and
mixing the extracted magnitude components and the processed magnitude components with a mixing ratio which is dependent on the detector signal.

9. A method as claimed in claim 8,
wherein the processing comprises a smoothing function over time.

10. A method as claimed in claim 8,
wherein the processing comprises a smoothing function with a first time constant when multipath interference is not detected, and a smoothing function with a second time constant, which is longer than the first time constant, when multipath interference is detected.

11. A method as claimed in claim 8, wherein the processing comprises
a smoothing function with a first time constant when multipath interference is not detected, and
a fixing function when multipath interference is detected, which fixes the extracted magnitude components affected by multipath interference to the smoothed level of the extracted magnitude components not affected by multipath interference.

12. A method as claimed in claim 8 comprising:
receiving a binary signal indicating the presence or absence of multipath interference, and processing the extracted magnitude components only when the presence of multipath interference is indicated.

13. The audio signal processing method of claim 8, further comprising:
delaying the audio signal; and
converting the delayed audio signal from the time domain to the frequency domain.

14. An article of manufacture including a non-transitory, tangible machine readable storage medium containing executable machine instructions for implementing the method of claim 8.

* * * * *